United States Patent [19]
Knox

[11] Patent Number: 5,382,165
[45] Date of Patent: Jan. 17, 1995

[54] CALORIE COUNTER DEVICE AND METHOD FOR USE

[76] Inventor: Jayne B. Knox, 1000 Asbury Rd., Columbia, S.C. 29209

[21] Appl. No.: 93,318

[22] Filed: Jul. 16, 1993

[51] Int. Cl.$^6$ ............................................. G09B 19/02
[52] U.S. Cl. ...................................... 434/127; 434/203
[58] Field of Search .......................... 434/127, 203, 246

[56] References Cited

U.S. PATENT DOCUMENTS

| | | | |
|---|---|---|---|
| 1,395,094 | 10/1921 | Collins | 116/324 |
| 1,899,382 | 2/1933 | Berry | 116/324 |
| 2,381,494 | 8/1945 | Gulbransen | 434/127 |
| 2,463,763 | 3/1949 | Graff | 116/324 |
| 2,660,145 | 11/1953 | Odlas | 116/313 |
| 2,670,707 | 3/1954 | Abrams et al. | 116/313 |
| 2,744,490 | 5/1956 | Evanoff | 116/321 |
| 2,965,292 | 12/1960 | Lewis | 116/323 |
| 3,195,813 | 7/1965 | Hart | 434/127 |
| 3,841,260 | 10/1974 | Sharp et al. | 116/136 |
| 4,310,316 | 1/1982 | Thomann | 434/127 |
| 4,335,300 | 6/1982 | Shepherd | 235/123 |
| 4,606,555 | 8/1986 | Adams | 283/52 |
| 4,625,675 | 12/1986 | Rosenberg | 116/324 |
| 4,652,241 | 3/1987 | McCarty | 434/127 |
| 4,832,603 | 5/1989 | Basil | 434/127 |
| 4,976,622 | 12/1990 | Clark | 434/127 |

FOREIGN PATENT DOCUMENTS 0564936  2/1944  United Kingdom ................ 434/246

*Primary Examiner*—Gene Mancene
*Assistant Examiner*—Jeffrey A. Smith

[57] ABSTRACT

A calorie counting device comprising a card with a plurality of bands surrounding the card, a plurality of beads movably attached to each of the bands, means for determining a correct number of beads representing a given portion of food, and a method of using the device by moving the representative number of beads relative to the plurality of beads on the band, repeating the determination and movement of representative beads relative to each portion of each type food eaten during a given time period, and returning the beads on each of the bands to the original position at the end of the time period in order to begin again the method of calorie counting during a new time period.

20 Claims, 2 Drawing Sheets

CALORIE COUNTER DEVICE AND METHOD FOR USE

The present invention relates to a device and method to assist in regulating a diet and more specifically to a portable, easy-to-use device and method to calculate and track the number of calories from each of several food groups consumed in a day.

BACKGROUND OF THE INVENTION

The importance of a balanced diet in maintaining a healthy lifestyle is better appreciated by a growing number of individuals, and interest in finding a reasonable means of managing one's diet is increasing. Several diet control systems and methods are available to assist in this management effort.

One of the most common systems starts with a pre-set daily calorie limit, then requires the user to estimate the calories in each item of food being consumed and to cease eating when that calorie limit is reached. One drawback to this type system is the difficulty in estimating the number of calories in food being consumed. Another drawback is the difficulty of planning in advance for foods to be consumed so that a balanced diet is maintained.

A book published by the American Diabetic Association for use by diabetics sets forth different foods in various groups along with the quantity that represents a unit or portion of each of the different foods. These exchange groups contain foods with similar amounts of carbohydrate, protein, fat, and calories. A diabetic is taught how to use this book in order to maintain the diet prescribed by medical personnel. The difficulties with a diet control method involving a book is that it is time consuming and requires recordation of what has been consumed.

Systems requiring a written record of the food consumed are inherently more complex to use and frequently subject to inadvertence and oversight so that at the end of the day the question arises as to what and how much of a particular food was consumed.

Other systems or methods involve moving pegs, cards, tickets, magnets or other objects representing portions of various food groups from an original location to a second location as the user consumes the various foods. While these systems or methods provide systematic monitoring of a diet, they tend to be too bulky to be carried easily, cumbersome to use, and the various movable parts are subject to being misplaced.

As a result of the above described problems and deficiencies, none of the known systems or methods for managing a diet has successfully satisfied the need for a portable, easy-to-use device and method to calculate and track the number of calories from each of several food groups consumed in a day.

Therefore, it is a principal object of the present invention to provide such a portable, easy-to-use device and method.

SUMMARY OF THE INVENTION

Accordingly, the device for counting calories of the present invention comprises a card, a plurality of bands surrounding the card, and a plurality of beads movably attached to each of the bands. The card may be dimensioned so as to fit in a pocket or wallet and may be laminated or plastic-coated to make it long-wearing and to facilitate cleaning. The card may be formatted to accommodate various calorie intake limits, for example; 2000, 1800, 1500, 1200, or 1000 calorie limits may be represented. The beads may be color-coded to reflect the various food groups from which selections may be made. Additionally, the beads may be differentially shaped to designate which foods may be eaten at various times during the day. For example, spherical beads may represent breakfast portions, cubic beads may represent luncheon portions, with other shapes representing dinner and snack portions. The method for using the device of the present invention involves means for determining a correct number of beads representing given portions of food, moving the representative number of beads relative to the plurality of beads on a given band, repeating the determination of representative beads relative to each portion of each type food eaten during a given time period, and returning the beads on each of the bands to the original position at the end of the time period in order to begin again the method of calorie counting at the next time period. The means for determining a correct number of beads may be a companion booklet containing extensive examples of appropriate serving size portions of various foods. The means for determining a correct number of beads may also be several panels imprinted on the back of the card, each panel containing numerous examples of portions of foods from one of the major food groups.

The time period during which the allowed quantity of food is to be eaten may generally be considered one twenty-four hour day.

An object of the present invention is to provide a calorie counter which is portable and easily carried on one's person.

Another object of the present invention is to provide an easy-to-use calorie counter which provides information on foods consumed as well as foods yet to be consumed in a given time period.

Yet another object of the present invention is to provide information for one of several predetermined daily calorie intake diets which does not require a written record of calorie intake.

Other and more specific objects will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings, in which.

DETAILED DESCRIPTION OF THE PRESENTLY PREFERRED EXEMPLARY EMBODIMENT

Figure 1:
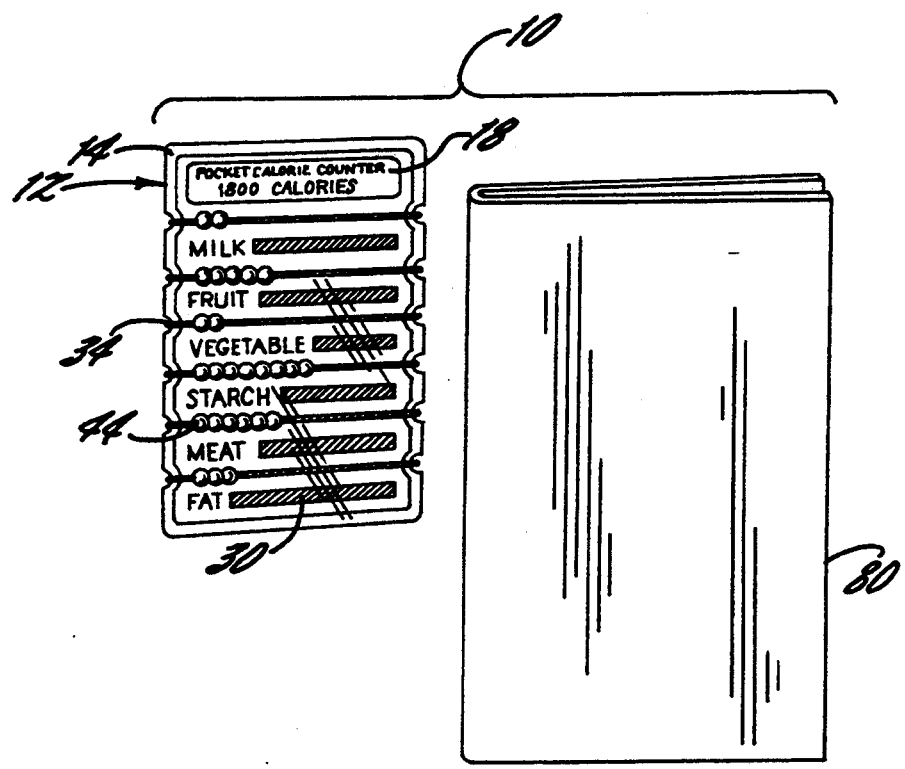
FIG. 1 is a plan view of the presently preferred embodiment of the present invention showing the plurality of beads on the plurality of bands of the card and an accompanying booklet.
Figure 2:
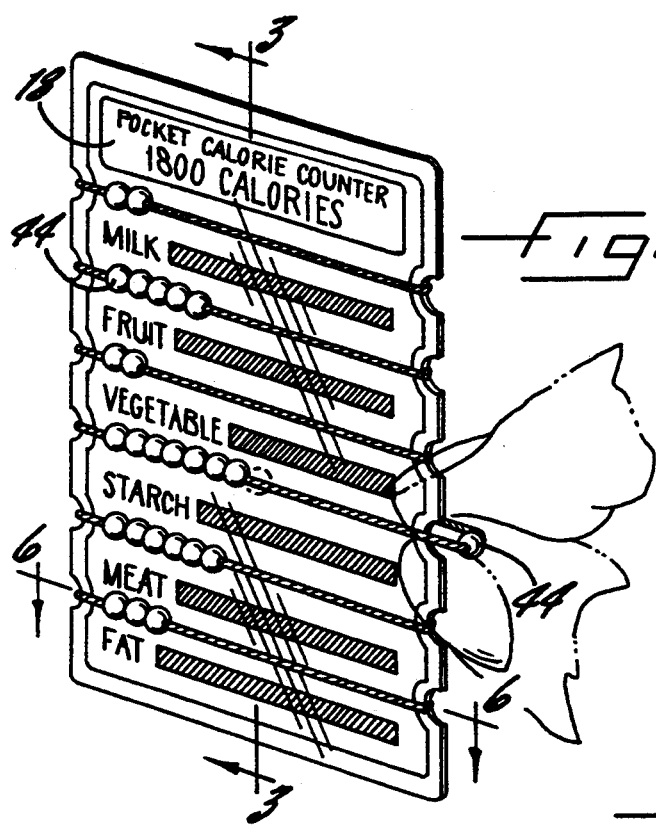
FIG. 2 is a perspective view of the presently preferred embodiment of the device of the present invention showing one of the beads being moved from the front of the card to the back of the card.
Figure 4:
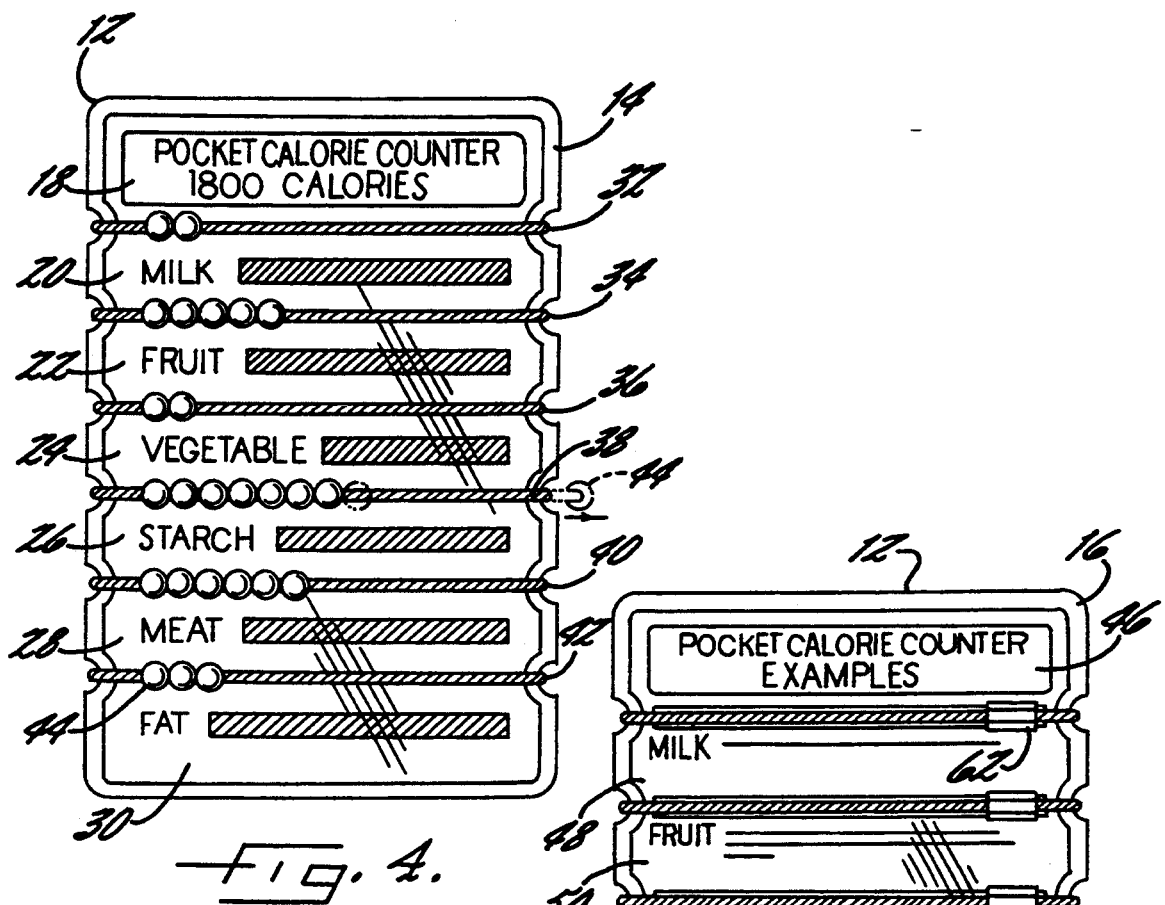
FIG. 4 is a front elevational view of the presently preferred embodiment of the device of the present invention showing one of the beads being moved from the front of the card to the back of the card.
Figure 5:
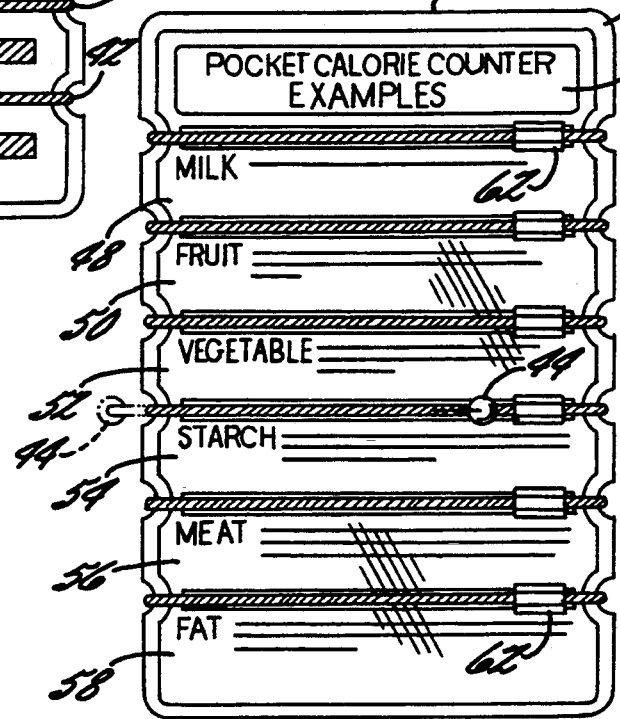
FIG. 5 is a rear elevational view of the presently preferred embodiment of the device of the present invention showing one of the beads being moved from the front of the card to the back of the card.

In FIG. 1, the calorie counting device 10 includes a card 12 with a front 14, a back 16, seen in FIG. 5, and an informational booklet 80. On front 14, seen in FIG. 4, is located a calorie intake limit designation panel 18, which by way of example is designated eighteen hundred (1800) calories; a plurality of food group designation panels 20-30. Each of food group designation panels 20-30 correlates to food group bands 32-42. For example, food group designation panel 20, labeled MILK, correlates to food group band 32; panel 22, labeled FRUIT, to band 34; panel 24, labeled VEGETABLE, to band 36; panel 26, labeled STARCH, to band 38; panel 28, labeled MEAT, to band 40; and panel 30, labeled FAT, to band 42. Bands 32-42 are preferably made of a durable, expandable material such as coated elastic or the like so as to tension grip card 12. Bands 32-42 encircle card 12 at locations on card 12 above the corresponding food group designation panel 20-30. Movably attached to bands 32-42 are a plurality of beads 44 representing the allowable number of portions of the food group represented by each of bands 32-42. Beads 44 may be preferably color-coded to correspond with the food group to which they relate. For example: MILK may be white, FRUIT orange, VEGETABLE green, STARCH brown, MEAT black, and FAT red. Additionally, beads 44 may also be differentially shaped to designate which foods may be eaten at various times during the day. As shown in FIG. 2, when a portion from a given food group is consumed, a representative bead 44 is relocated from front 14 of card 12 to back 16 of card 12. Because of the elastic tension in the representative band, the relocated bead will remain in its new location on back 16 of card 12. In this manner, the user may quickly ascertain what types and quantities of food have been eaten (beads on back of card) and what types and quantities of food may yet be eaten (beads on front of card) in a given time period. For general purposes, device 10 is intended to assist a user in tracking calorie consumption on a daily basis. When all beads 44 have been relocated to back 16 of card 12, the user may not have any more food in the given time period. At the end of the given time period all beads 44 on back 16 of card 12 are returned to front 14 of card 12 to begin the process again. The device 10 of the present invention is reusable. The simple, sturdy construction of card 12 should allow it to be used over an extended period of time.

Figure 3:
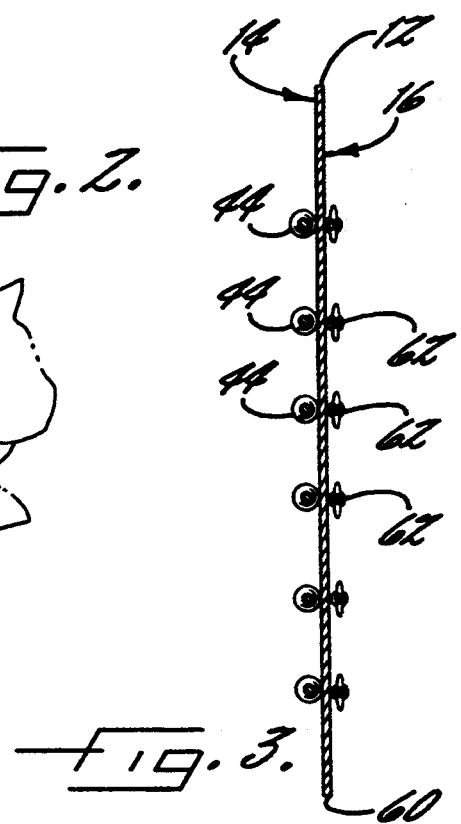
FIG. 3 is a side elevational view of the presently preferred embodiment of the device of the present invention.

As shown in FIG. 3, device 10 is quite slim and therefore may be easily carried in a shirt pocket or wallet. Because beads 44 moved from front 14 to back 16 as representative portions of food are consumed are held by elastic tension, they should not become dislodged or lost in the course of use of device 10.

On back 16 of card 12, seen in FIG. 5, is located an example designation panel 46, and food group example panels 48-58 corresponding to six food groups. The six food groups reflect the six exchange lists recognized by The American Dietetic Association and the American Diabetes Association, Inc. For example, food group example panel 48 corresponds to the MILK food group, panel 50 to FRUIT, panel 52 to VEGETABLE, panel 54 to STARCH, panel 56 to MEAT, and panel 58 to FAT. Each panel lists thereon examples of suitable portion sizes and the appropriate beads 44 indicate the suitable number of portions for the predetermined calorie intake limit of card 12. The user is thereby assisted in making proper selections in order to stay within the allotted calorie intake limit.

Figure 6:
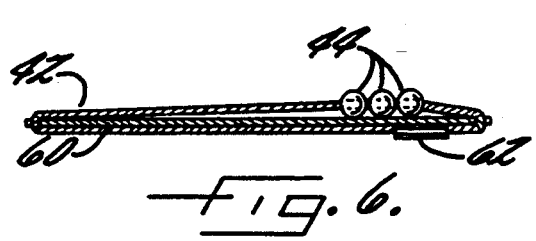
FIG. 6 is a bottom elevational view of the presently preferred embodiment of the device of the present invention.

FIG. 6 shows the bottom 60 of card 12 with beads 44 on band 42. Band 42 receives a plurality of beads 44 then is wrapped about card 12 and held together by a clamp 62 of metal or durable plastic. Each of the other bands likewise receive beads 44 and are clamped by similar clamps.

Booklet 80 contains additional examples of portion sizes, and may be carried with card 12 until the user feels comfortable making portion selections and allocating those selections to the proper food group. Because of its size, booklet 80 is compatible in a pocket or wallet with card 12.

Other embodiments of the invention will be apparent to those skilled in the art from a consideration of this specification or practice of the invention disclosed herein. It is intended that the specification be considered as exemplary only, with the true scope and spirit of the invention being indicated by the following claims.

What is claimed is:

1. A device for counting calories comprising:
    a card having an front surface and a back surface,
    a plurality of elastic bands circumferentially surrounding said card and disposed in spaced parallel relationship, and
    a plurality of beads movably attached to each of said bands, said beads movable from said front surface of said card to said back surface.

2. A device as is claim 1, wherein said back surface of said card incorporates appropriate examples of portions from each of a plurality of major food groups, and said front surface of said card incorporates the plurality of major food groups.

3. The device as in claim 2, wherein said plurality of bands are spaced on said card relative to said examples.

4. The device as in claim 2, wherein said plurality of major food groups comprises groups designated Milk, Fruit, Vegetable, Starch, Meat, and Fat.

5. The device as in claim 1, wherein said plurality of beads is calibrated to provide a nutritionally balanced diet limited to a predetermined number of calories.

6. A device as in claim 1, wherein said plurality of beads on each of said bands is of one color, and said color is not repeated on other said bands.

7. The device as in claim 1, wherein said bands are tensionally held in place around said card.

8. A method for counting calories comprising the steps of:
    obtaining a card having an front surface and a back surface, with a plurality of elastic bands circumferentially surrounding said card and disposed in spaced parallel relationship, a plurality of beads movably attached to each of said bands, said beads movable from said front surface of said card to said back surface, and means for determining a number of said beads representing a given portion of food eaten;
    moving said representative number of said beads from a first position relative to said front surface of said card and relative to said plurality of beads on said bands to a second position relative to said back surface of said card on said bands;

repeating the determination of representative beads relative to each portion of food eaten during a given time period;

repeating said moving step for each determination of each portion of food eaten during said given time period, and;

returning said beads on each of said bands to said first position relative to said front surface of said card at the end of said time period in order to begin again said method of calorie counting during a new time period.

9. The method as in claim 8, wherein said determining means is a plurality of appropriate examples incorporated on said back surface of said card of portions from each of a plurality of major food groups.

10. The method as in claim 9, wherein said plurality of bands are spaced on said card relative to said examples.

11. The method as in claim 9, wherein said plurality of major food groups comprises groups designated Milk, Fruit, Vegetable, Starch, Meat, and Fat.

12. The method as in claim 8, wherein said determining means is an accompanying booklet containing a plurality of examples of appropriate portions of various foods from each of a plurality of major food groups.

13. The method as in claim 12, wherein said plurality major food groups comprises groups designated Milk, Fruit, Vegetable, Starch, Meat, and Fat.

14. The method as in claim 12, wherein said time period is one twenty-four hour day.

15. The method as in claim 8, wherein said plurality of beads on each of said bands is of one color, and said color is not repeated on other said bands.

16. The method as in claim 8, wherein said plurality of beads is calibrated to provide a nutritionally balanced diet limited to a predetermined number of calories.

17. The method as in claim 16, wherein said predetermined number of calories is that number recommended for healthy controlled weight reduction.

18. The method as in claim 16, wherein said predetermined number of calories is that number sufficient to maintain a given body weight.

19. The method as in claim 8, wherein said moving step comprises sliding said beads from said first position on said band to said second position on said band.

20. The method as in claim 19, wherein said returning step comprises sliding said beads from said second position to said first position.

* * * * *